(12) United States Patent
Mansfield (10) Patent No.: US 8,761,949 B2
(45) Date of Patent: Jun. 24, 2014

(54) METHOD AND SYSTEM FOR MITIGATING IMPACT OF MALFUNCTION IN ACTUAL LOAD DETERMINATION ON PEAK LOAD MANAGEMENT

(75) Inventor: Carl Mansfield, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 13/484,633

(22) Filed: May 31, 2012

(65) Prior Publication Data

US 2013/0325198 A1    Dec. 5, 2013

(51) Int. Cl.
*G06F 1/26* (2006.01)

(52) U.S. Cl.
USPC ............... 700/291; 700/286; 700/295

(58) Field of Classification Search
USPC .......................................................... 700/291
See application file for complete search history.

(56) References Cited

U.S. PATENT DOCUMENTS

| | | | |
|---|---|---|---|
| 5,880,536 A | 3/1999 | Mardirossian | |
| 7,069,161 B2 | 6/2006 | Gristina et al. | |
| 7,136,725 B1 * | 11/2006 | Paciorek et al. | 700/295 |
| 7,231,281 B2 * | 6/2007 | Costa | 700/286 |
| 7,274,975 B2 | 9/2007 | Miller | |
| 7,313,465 B1 | 12/2007 | O'Donnell | |
| 7,355,301 B2 * | 4/2008 | Ockert et al. | 307/29 |
| 7,516,106 B2 * | 4/2009 | Ehlers et al. | 705/412 |
| 7,774,651 B2 * | 8/2010 | Mukherjee et al. | 714/26 |
| 8,019,697 B2 | 9/2011 | Ozog | |
| 8,078,330 B2 * | 12/2011 | Brickfield et al. | 700/291 |
| 8,295,989 B2 * | 10/2012 | Rettger et al. | 700/291 |
| 8,410,633 B2 * | 4/2013 | Batzler et al. | 307/41 |
| 8,415,830 B2 * | 4/2013 | Lim et al. | 307/41 |
| 2006/0122738 A1 | 6/2006 | Yamada et al. | |
| 2010/0106641 A1 * | 4/2010 | Chassin et al. | 705/40 |
| 2010/0114799 A1 | 5/2010 | Black et al. | |
| 2010/0174417 A1 * | 7/2010 | Iida et al. | 700/292 |
| 2011/0047418 A1 | 2/2011 | Drees et al. | |
| 2011/0061015 A1 * | 3/2011 | Drees et al. | 715/771 |
| 2011/0218691 A1 * | 9/2011 | O'Callaghan et al. | 700/296 |
| 2011/0313585 A1 | 12/2011 | Park | |
| 2012/0083927 A1 * | 4/2012 | Nakamura et al. | 700/278 |
| 2012/0326883 A1 * | 12/2012 | Angelis et al. | 340/870.02 |
| 2013/0030590 A1 * | 1/2013 | Prosser | 700/295 |
| 2013/0073273 A1 * | 3/2013 | Madrazo et al. | 703/13 |
| 2013/0085614 A1 * | 4/2013 | Wenzel et al. | 700/277 |

FOREIGN PATENT DOCUMENTS

WO    WO 9913426    * 3/1999

* cited by examiner

*Primary Examiner* — Ryan Jarrett
*Assistant Examiner* — Michael J. Scapin
(74) *Attorney, Agent, or Firm* — Scot A. Reader (57) ABSTRACT

Method and system for mitigating the impact on peak load management of a malfunction in determining actual load at a site by substituting a predicted load for actual load while the malfunction persists. Using a predicted load as a substitute for actual load during the malfunction period avoids use of a grossly overestimated or underestimated actual load that if used could cause suboptimal use of battery power and decimate cost savings from peak load management.

22 Claims, 6 Drawing Sheets

METHOD AND SYSTEM FOR MITIGATING IMPACT OF MALFUNCTION IN ACTUAL LOAD DETERMINATION ON PEAK LOAD MANAGEMENT

BACKGROUND OF THE INVENTION

The present invention relates to power management and, more particularly, to managing the peak load drawn by a site owner on an electric utility to reduce the site owner's utility bills.

Utility bills often include a peak load component that assesses a site owner a charge based on the peak usage of grid power at the site during a multi-day billing period. The multi-day billing period is typically about 30 days, but may be up to a year. The peak load is typically assessed as the maximum average load in any 30 or 60 minute period within the multi-day billing period.

To reduce the amount of the peak load charge, it is known to deploy a peak load management system that continually measures load at the site throughout the billing period and limits the use of grid power to a target peak load. The target peak load is often statically configured for the billing period, either manually or by an algorithm running on the management system.

Figure 1:
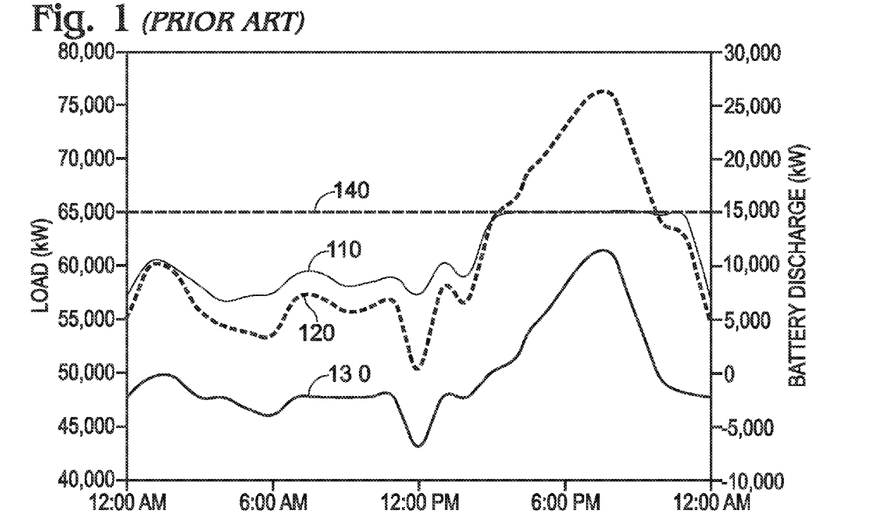
FIG. 1 is a load-time diagram showing peak load management by a conventional peak load management system.

FIG. 1 is a load-time diagram that illustrates peak load management by a conventional peak load management system, wherein the x-axis is time of day, the left y-axis is load in kilowatts and the right y-axis is battery discharge in kilowatts. Grid load 110 is the net load drawn on the electric utility that is used by the utility in calculating monthly charges. Actual load 120 is a sum of grid load 110 and stored power 130 discharged by a battery system. Actual load 120 represents the load drawn by electricity-using devices at the site, not counting the impact of the battery system, and can be considered the load profile of the site had no load management battery system been installed. At some sites, actual load 120 may be reduced by power generated at the site (e.g., output from a solar generator). Whenever during the billing period actual load 120 exceeds a target peak load 140, the management system discharges stored power 130 from the battery system (i.e., stored power 130 turns positive) to keep grid load 110 from exceeding target peak load 140. Once actual load 120 falls below target peak load 140, the management system stops discharging stored power 130 from the battery system and the battery system may be recharged (i.e., stored power 130 may turn negative).

Figure 2:
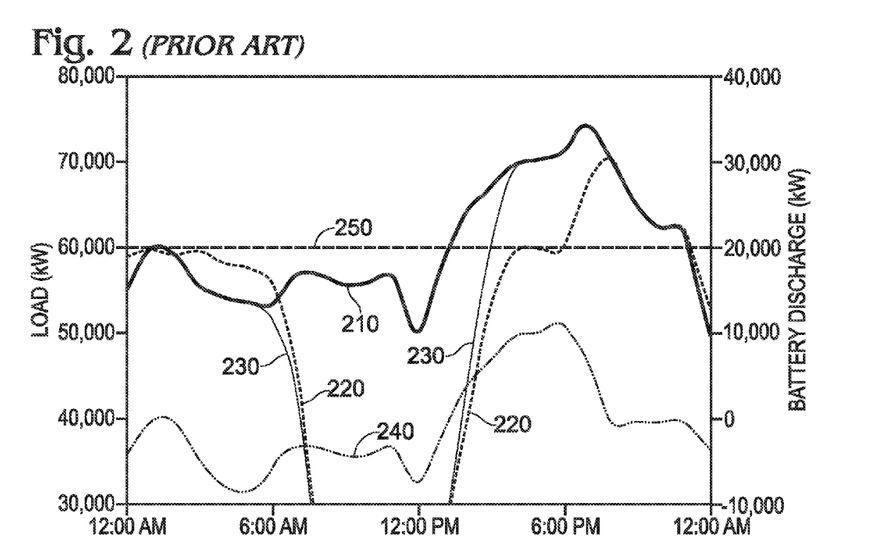
FIG. 2 is a load-time diagram showing peak load management error caused by failure to account for power generated at a site when determining actual load.

For a conventional peak load management system to perform optimally, it must have accurate data on actual load at the site. Otherwise, the management system may discharge stored power from the battery system too early or too late, resulting in an elevated peak load and reduced cost savings. For example, FIG. 2 is a load-time diagram showing peak load management error caused by failure to account for power generated at the site (e.g., output from a solar generator) when determining actual load. The true actual load 230 is the sum of the grid load 220 and the stored power 240 discharged by a battery system, offset by the power generated at the site. However, due to failure to account for power generated at the site, the management system sees an erroneous actual load 210 that grossly overestimates true actual load 230. Such a failure might result from malfunction of a meter that measures power generation at the site or of a communications channel between such a meter and a peak load management controller. Regardless of the source of the malfunction, the effect of failure to account for power generated at the site is to overestimate actual load, which causes battery power to be discharged before true actual load 230 rises above a target peak load 250. The premature discharge of battery power results in exhaustion of battery resources before true actual load 230 falls back below target peak load 250, causing grid load 220 to spike well above target peak load 250.

Figure 3:
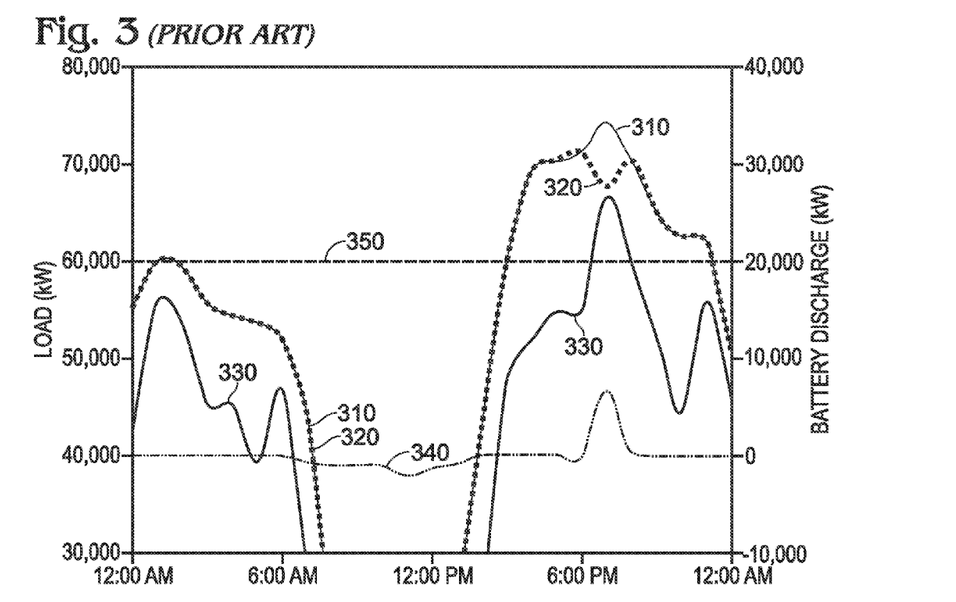
FIG. 3 is a load-time diagram showing peak load management error caused by failure to account for all power consumed at a site when determining actual load.

In another example, FIG. 3 is a load-time diagram showing peak load management error caused by failure to account for all power consumed at the site when determining site load. The true actual load 310 is the sum of the grid load 320 and the stored power 340 discharged by a battery system offset by the power generated at the site. However, due to failure to account for all power consumed at the site, the management system sees an erroneous actual load 330 that grossly underestimates true actual load 310. Such a failure might result from malfunction of a meter that measures power consumption at the site or a communications channel between such a meter and a peak load management controller. Regardless, the effect of failure to account for all power consumed at the site is to underestimate true actual load 310, which causes battery power discharge to be postponed until after true actual load 310 rises above a target peak load 350. The belated discharge of battery power results in grid load 320 rising to a level well in excess of target peak load 350 before the discharge of battery power starts to dampen grid load 320.

In other examples, a catastrophic failure in determining actual load at the site may occur that prevents the peak load management system from making an even remotely informed decision about when to discharge battery power.

In any of these circumstances, the lack of accurate data on actual load at the site can quickly decimate the cost savings that would otherwise be achieved by the peak load management system.

SUMMARY OF THE INVENTION

The present invention mitigates the impact on peak load management of a malfunction in determining actual load at a site by substituting a predicted load for actual load while the malfunction persists. Using a predicted load as a substitute for actual load during the malfunction period avoids use of a grossly overestimated or underestimated actual load that if used could cause suboptimal use of battery power and decimate cost savings from peak load management.

In one aspect of the invention, a peak load management system comprises a battery system configured to store power and discharge stored power; a measurement system configured to acquire actual load data; and a peak load management controller operatively coupled with the battery system and the measurement system and configured to receive actual load data from the measurement system and regulate a discharge of stored power from the battery system based at least in part on a comparison of actual load determined using the actual load data and a target peak load, wherein the management controller is further configured to detect a malfunction in determining actual load and in response to the malfunction regulate the discharge of stored power from the battery system based at least in part on a comparison of a predicted load and the target peak load.

In some embodiments, the management controller is further configured to detect a recovery from the malfunction and in response to the recovery resume regulating the discharge of stored power from the battery system based at least in part on a comparison of actual load and the target peak load.

In some embodiments, the management controller is further configured to compute the predicted load based at least in part on past actual load.

In some embodiments, the predicted load is an expected load on a worst case day of billing period. In some embodiments, the worst case day is the day of the billing period on which a highest energy usage is recorded while actual load exceeds the target peak load. In other embodiments, the worst case day is the day of the billing period on which a highest maximum actual load is recorded.

In some embodiments, the discharge of stored power from the battery system is regulated at least in part by discharging stored power from the battery system when actual load exceeds the target peak load.

In some embodiments, the discharge of stored power from the battery system is regulated at least in part by discharging stored power from the battery system when the predicted load exceeds the target peak load.

In some embodiments, the malfunction comprises a malfunction of the measurement system.

In some embodiments, the malfunction comprises a malfunction of a communication channel between the measurement system and the management controller.

In some embodiments, the malfunction comprises a malfunction of the management controller.

In some embodiments, the management controller is further configured to shed actual load in response to the malfunction.

In some embodiments, the management controller is configured to use weather data to determine an amount of actual load that is shed.

In some embodiments, actual load is a net load representing power consumed at a site reduced by power generated at the site.

In another aspect of the invention, a peak load management method comprises the steps of acquiring, by a peak load management system, actual load data; regulating, by the management system, a discharge of stored battery power based at least in part on a comparison of actual load determined using the actual load data and a target peak load; detecting, by the management system, a malfunction in determining actual load; and, in response to the malfunction, regulating, by the management system, the discharge of stored battery power based at least in part on a comparison of a predicted load and the target peak load.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 4:
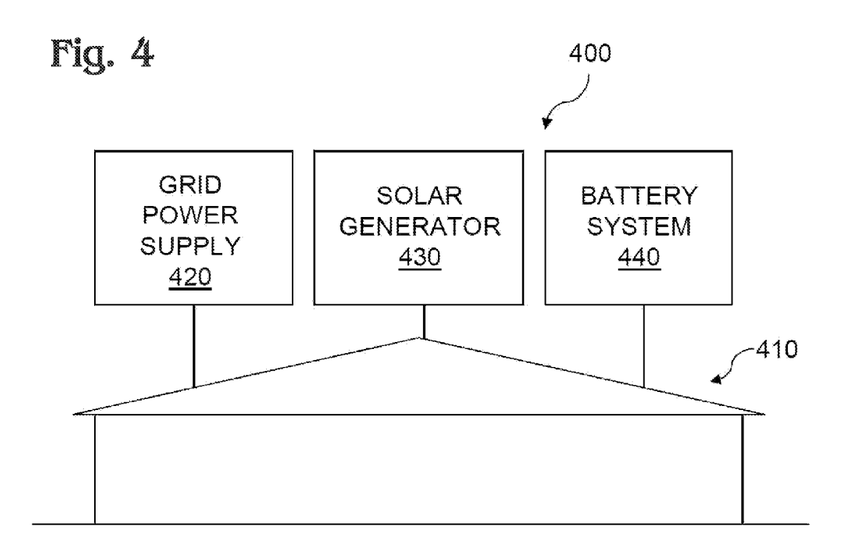
FIG. 4 shows a power system for a site.

FIG. 4 shows a power system 400 for a site 410 operated by a site owner who is a customer of an electric utility. Power system 400 includes multiple power sources that supply power to site 410 at various times and in various amounts. The power sources include a grid power supply 420 drawn on the electric utility. The electric utility that supplies the grid power bills the site owner periodically, such as monthly, for grid power. These periodic electric utility bills include a peak load component that assesses the site owner a charge based on the peak usage of grid power at site 410 during the billing period. The power sources also include a solar generator 430 that supplies power to site 410 during daylight hours, at least partially offsetting the use of grid power. Moreover, the power sources include a battery system 440 that, under control of a peak load management system 500, discharges stored power as needed to cap the usage of grid power at a target peak load, which caps the peak load charge on the site owner's utility bills. Battery system 440 includes one or more batteries that are recharged at non-peak times using grid and/or solar power.

In some embodiments, a power system for a site includes a different type of generator, such as a diesel generator or wind turbine, in lieu of or in addition to a solar generator. In still other embodiments, a power system for a site does not include any type of generator.

Figure 5:
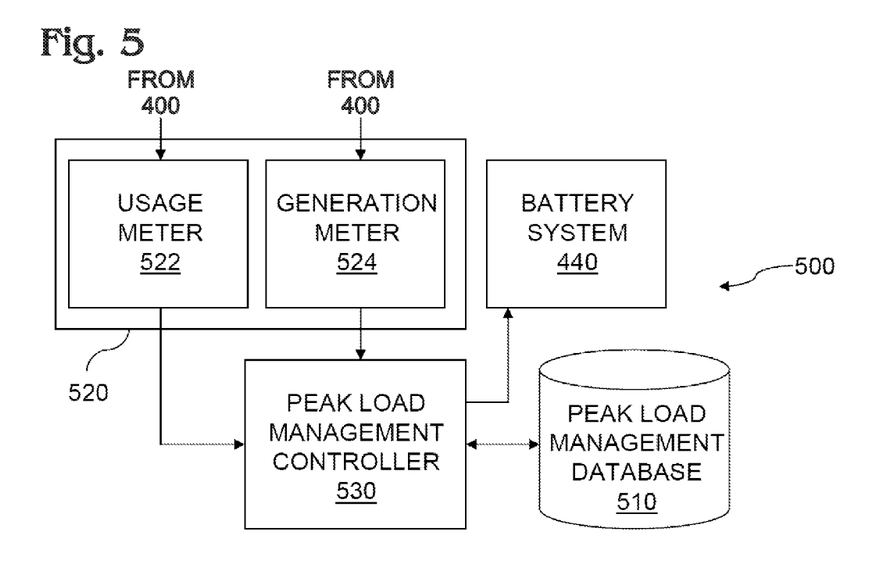
FIG. 5 shows a peak load management system for the site.

FIG. 5 shows peak load management system 500 in more detail. Management system 500 includes a peak load management database 510, a site load measurement system 520, a peak load management controller 530 and battery system 440.

Management database 510 is a data repository managed by management controller 530. Management database 510 stores data pertaining to actual load draw on power system 400 and predicted load expected to be drawn on power system 400.

Measurement system 520 includes a usage meter 522 and a generation meter 524 that continually measure actual load draw on power system 400. Actual load is a net load representing the power drawn on grid power supply 420 and battery system 440, measured by usage meter 522, reduced by the power supplied by solar generator 430, measured by generation meter 524. Actual load measurements are taken for each time increment (e.g., one minute) for each day of each billing period. The measurements are relayed to management controller 530 over communication channels connecting usage meter 522 and generation meter 524 with management controller 530. Usage meter 522 and generation meter 524 may be electric meters, smart meters, voltage probes, current probes or other power measurement devices.

In other embodiments, a usage meter only measures power drawn on the grid and power drawn on the battery system is measured by a different meter of the measurement system or is determined by the management controller. The management controller is able to determine power drawn on the battery system attendant to regulating the power outputted by the battery system in real-time.

Accordingly, in different embodiments, actual load data relayed by the measurement system to the management controller may include measurements of individual components used in computing actual load (e.g., grid power draw, solar power generation, battery power draw), aggregations of components used in computing actual load, or fully computed actual load.

Management controller 530 receives configuration data inputted into management system 500, such as site operations data, weather data, the charge capacity of battery system 440 and the safety margin, if any, to be built into the target peak load. Management controller 530 continually receives actual load data from measurement system 520. Management controller 530 computes predicted load data relative to the load expected to be drawn on power system 400 on the worst day of the billing period from past actual load data and supplemental data such as site operations data, weather data and seasonal, weekly and daily trend data. The worst case day of the billing period is the day expected to have the largest peak load as determined by predicted peak height and width. The predicted load data include the target peak load and other parametric values. In embodiments where the actual load data received from the measurement system do not include fully computed actual load, the management controller also computes actual load from the actual load data. Management controller 530 stores the configuration data, actual load (and related parametric values) and predicted load data (including the target peak load and other parametric values) in management database 510. Management controller 530 is a general purpose controller that performs its functions by executing software instructions. In other embodiments, a management controller may perform some or all of its functions in custom logic.

To prevent grid power use from exceeding the target peak load, management controller 530 regulates the discharge of stored power from battery system 440 based on a comparison of an effective load with the target peak load. When actual load is being properly determined, management controller 530 uses actual load as the effective load. That is, management controller 530 determines whether actual load drawn on power system 400 exceeds the target peak load, and discharges stored power from battery system 440 when actual load exceeds the target peak load. However, when actual load is not being properly determined due to malfunction, management controller 530 uses the predicted load on the worst case day of the billing period as the effective load. That is, management controller 530 determines whether the predicted load expected to be drawn on power system 400, as computed by management controller 530, exceeds the target peak load, and discharges stored power from battery system 440 when the predicted load exceeds the target peak load. Using the predicted load as a substitute for actual load when actual load determination is malfunctioning eliminates the risk of using a grossly overestimated or underestimated actual load in the comparison with the target peak load, which if used could cause suboptimal use of battery power and severely limit cost savings achieved from peak load management.

Figure 6:
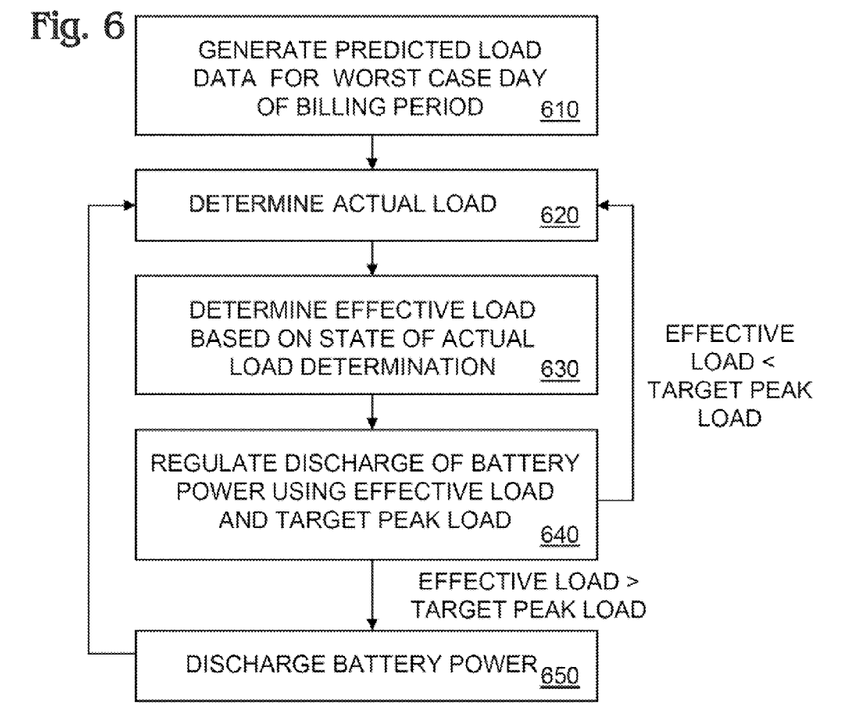
FIG. 6 shows a method performed by the management system for managing peak load that mitigates the impact of a malfunction in actual load determination.

FIG. 6 shows a method performed by management system 500 for managing peak load that mitigates the impact of a malfunction in determining actual load. At the outset, management controller 530 generates predicted load data for the worst case day of the billing period (610) and stores the predicted load data in management database 510. Management controller 530 computes the predicted load data from past actual load, supplemental data such as site operations data, weather data and seasonal, weekly and daily trend data, the charge capacity of battery system 440 ($B_c$) and the safety margin, if any, to be built into the target peak load. The predicted load data include the target peak load ($P_t$), the predicted time when actual load is expected to rise above the target peak load ($t_{ps}$), the predicted time when actual load is expected to fall below the target peak load ($t_{pe}$), the predicted time when actual load is expected to reach a maximum ($t_{max}$), the predicted maximum load ($P_p$) and a predicted fill factor (F). F is a value between zero and one and represents how rapidly the peak is expected to rise above $P_t$ after $t_{ps}$ and/or how late the peak drops down to $P_t$ before $t_{pe}$. For example, a hypothetical square shaped peak which rises immediately to $P_p$ at $t_{ps}$ and remains there until $t_{pe}$ would have a fill factor of one. To compute F, management controller 530 first computes the predicted average discharge of stored power by battery system 340 ($BP_{av}$) when actual load exceeds $P_t$. The average discharge is computed according to $$BP_{av} = B_c / (t_{pe} - t_{ps}).$$

Management controller 530 then computes F according to $$F = BP_{av} / (P_p - P_t).$$

Management controller 530 stores the predicted load data ($P_t$, $t_{ps}$, $t_{pe}$, $t_{max}$, $P_p$, F) in management database 510.

Management system 500 then enters a peak management loop. In the peak management loop, measurement system 520 measures actual load drawn on power system 400 (620). Actual load is a net load representing the power drawn on grid power supply 420 and battery system 440, measured by usage meter 522, reduced by the power supplied by solar generator 430, measured by generation meter 524. Measurements of actual load are taken for each time increment (e.g., one minute) for each day of each billing period and transmitted to management controller 530 over communication channels interconnecting usage meter 522 and generation meter 524 with management controller 530. In other embodiments, actual load data relayed by the measurement system to the management controller do not include fully computed actual load but rather measurements of individual components used in computing actual load (e.g., grid power draw, solar power generation, battery power draw) or aggregations of components used in computing actual load.

Figure 7:
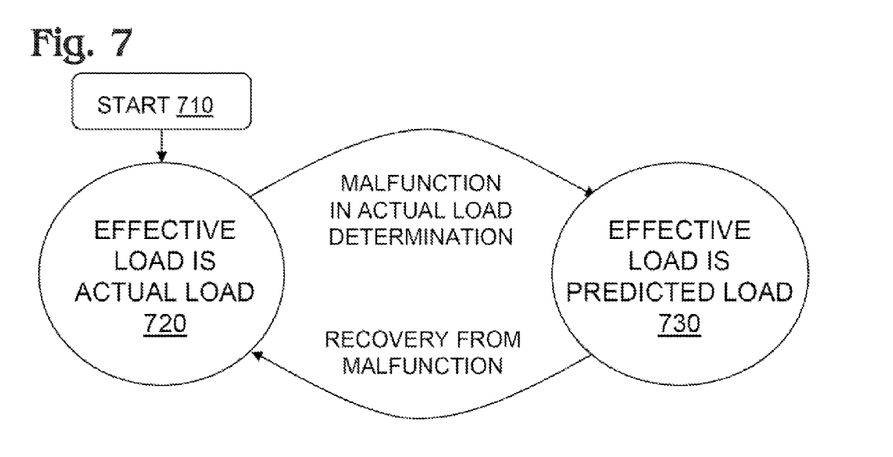
FIG. 7 shows a state diagram followed by the management system for determining the effective load used in the method of FIG. 6.

Next, management controller 530 determines the effective load based on the state of actual load determination (630). A state diagram followed by management system 530 for determining the effective load is shown in FIG. 7. Initially (710), management system 530 uses actual load determined from actual load data received from measurement system 520 as the effective load (720). However, when a malfunction in actual load determination is detected, management controller 530 uses the predicted load for the worst case day of the billing period as the effective load (730) until management controller 530 detects a recovery from the malfunction, at which point management controller 530 resumes using actual load determined from actual load data received from measurement system 520 as the effective load (720).

Management controller 530 may detect a malfunction in actual load determination in several ways. For example, management controller 530 may detect that actual load data received from usage meter 522 and/or generation meter 524 are abnormal. An abnormality may be presumed from a series of measurements that are unchanging or inconsistent with historical measurements at site 410. In another example, management controller 530 may detect a loss of communication on a communications channel between usage meter 522 and/or generation meter 524 and management system 530. In yet another example, management controller 530 may detect an inability on the part of management controller 530 to interpret actual load data received from usage meter 522 and/or generation meter 524. Management controller 530 may detect a recovery from such a malfunction in actual load determination by identifying a correction of the problem, for example, a series of measurements that are changing and consistent with historical measurements, reestablishment of communication on a communications channel, renewed ability to interpret received measurements, etc.

When management controller 530 detects a malfunction in actual load determination, management controller 530 computes a predicted load for the worst case day of the billing period using the predicted load data ($P_t$, $t_{ps}$, $t_{pe}$, $t_{max}$, $P_p$, F) stored in management database 510. The predicted load is a net load representing the power expected to be drawn on grid power supply 420 and battery system 440 less the power expected to be supplied by solar generator 430. The predicted load is computed for each time increment (e.g., one minute) for the worst case day of the billing period. Management controller 530 computes a peak for the predicted load that rises above $P_t$ at time $t_{ps}$, falls below $P_t$ at time $t_{pe}$, and reaches a maximum of $P_p$ at time $t_{max}$. F and a predetermined slope define the shape for the rising side of the peak ($t_{ps}$ to $t_{max}$) and the falling side of the peak ($t_{max}$ to $t_{pe}$). In some embodiments, the slope of the peak on the rising side and the falling side is constant (i.e., a straight line). In other embodiments, the slope of the peak on the rising side and the falling side varies (i.e., a curved line) according to a mathematical formula or shaping data in a lookup table configured in management database 510. In still other embodiments, F and/or the slope may differ for the rising side and the falling side of the peak. In those embodiments, a rising fill factor ($F_{up}$) may be used to compute the shape on the rising side of the peak and a falling fill factor ($F_{down}$) may be used to compute the shape on the falling side of the peak.

Management controller 530 also computes the predicted load at non-peak times that are outside of the time window between $t_{ps}$ and $t_{pe}$. This is done in order to allow management controller 530 to properly charge the battery in spite of failure in actual load determination During non-peak times when actual load is presumed to be close to $P_t$ (e.g., 6 a.m. to 10 p.m.), management controller 530 sets the predicted load to $P_t$ or a level just below $P_t$, which prevents any charge or discharge from battery system 440 during those times. During non-peak times where actual load is presumed to be substantially below Pt, (e.g., 10 p.m. to 6 a.m.), management controller 530 sets the predicted load to a level that is sufficiently below $P_t$ to allow battery system 440 to be fully recharged. For example, for a battery system with a 40 kilowatt-hour battery, management controller 530 may set the predicted load five kilowatts below $P_t$ between 10 p.m. and 6 a.m. so that management controller 530 will perceive ample leeway to fully recharge the battery during those hours.

Next, management controller 530 regulates discharge of battery power from battery system 440 using the effective load and $P_t$ (640). More particularly, management controller 530 compares the effective load, which is actual load if actual load determination is functioning properly and the predicted load if actual load determination is malfunctioning, against $P_t$. If the effective load exceeds $P_t$, management controller 530 controls battery system 440 to discharge battery power (650). On the other hand, if the effective load is below $P_t$, management system 530 inhibits battery system 440 from discharging battery power. In either event, the process returns to Step 620.

Figure 8:
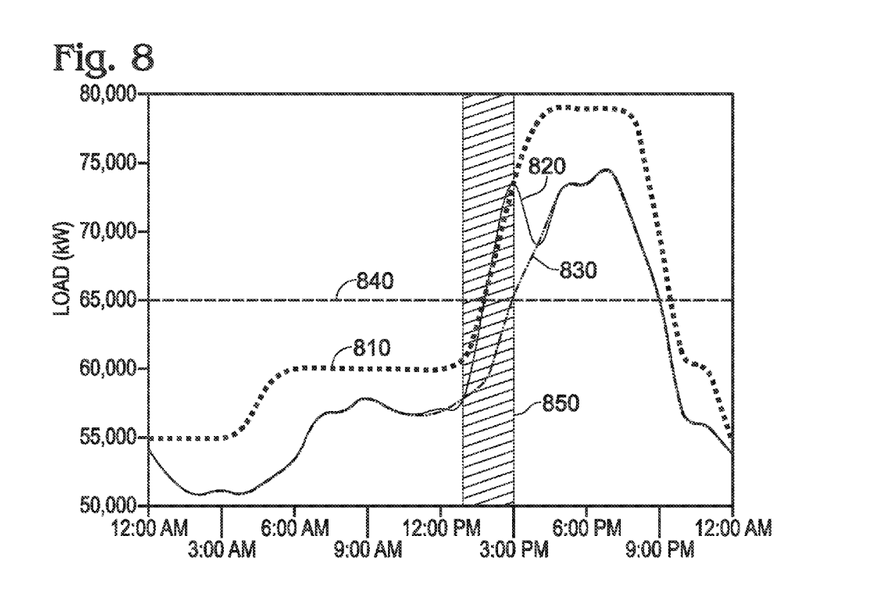
FIGS. 8 and 9 are load-time diagrams showing operation of the method of FIG. 6 where a malfunction in actual load determination is detected and true actual load is below predicted load throughout the malfunction period.
Figure 9:
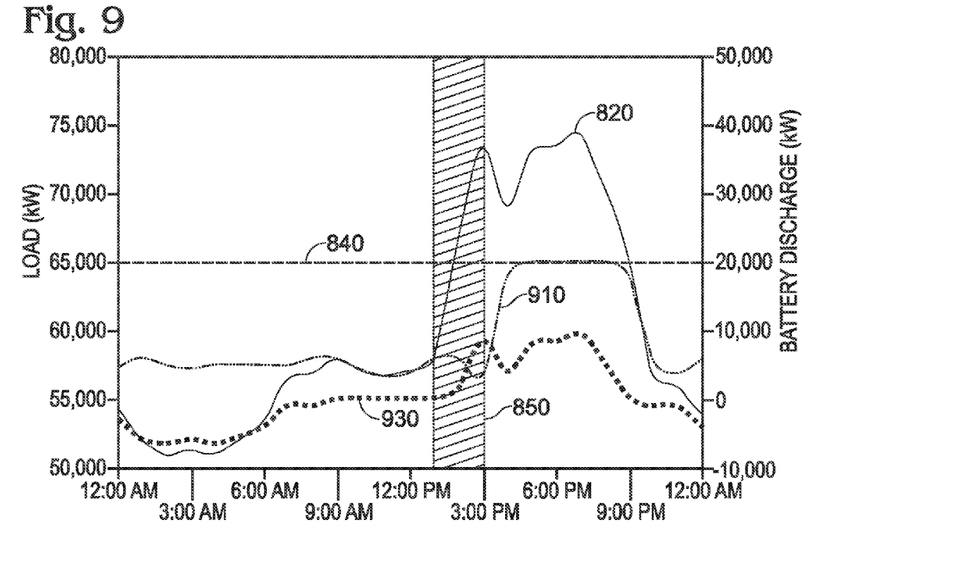

FIGS. 8 and 9 are load-time diagrams illustrating operation of the method of FIG. 6 where a malfunction in actual load determination is detected and actual load 830 is below the predicted load 810 throughout the malfunction period 850. The case where actual load is below the predicted load throughout the malfunction period is relatively common since the predicted load is computed from predicted load data for the worst case day of the billing period. Since predicted load 810 consistently overestimates actual load 830 in this case, using predicted load 810 as a substitute for actual load 830 causes more battery power than needed to keep grid load 910 from exceeding $P_t$ 840 to be used. However, the risk that grid load 910 will exceed $P_t$ 840 due to an erroneous determination of actual load is eliminated. In FIG. 8, management controller 530 computes predicted load 810 using predicted load data ($P_t$, $t_{ps}$, $t_{pe}$, $t_{max}$, $P_p$, F) stored in management database 510. Predicted load in the example illustrated includes three discrete sections including a peak, during peak load times, that rises above $P_t$; a first non-peak section, during non-peak load times where significant actual load is presumed, set just below $P_t$; and a second non-peak section, during non-peak load times where minimal actual load is presumed, set well below $P_t$. Initially, management controller 530 uses actual load 830 as the effective load 820. At the beginning of malfunction period 850, management controller 530 transitions to using predicted load 810 as effective load 820 to eliminate the risk of using a grossly underestimated actual load that could cause a misallocation of battery power and substantial increase in peak load. Then, at the end of malfunction period 850, management controller 530 reverts to using actual load 830 as effective load 820. Turning next to FIG. 9, it is seen that using predicted load 810 as effective load 820 during malfunction period 850 causes discharge of stored power 930 from battery system 440 earlier than would occur if there had been no malfunction. However, there is still ample battery capacity to keep the use of grid power 910 below $P_t$ 840 until effective load 820 falls below $P_t$ 840.

Figure 10:
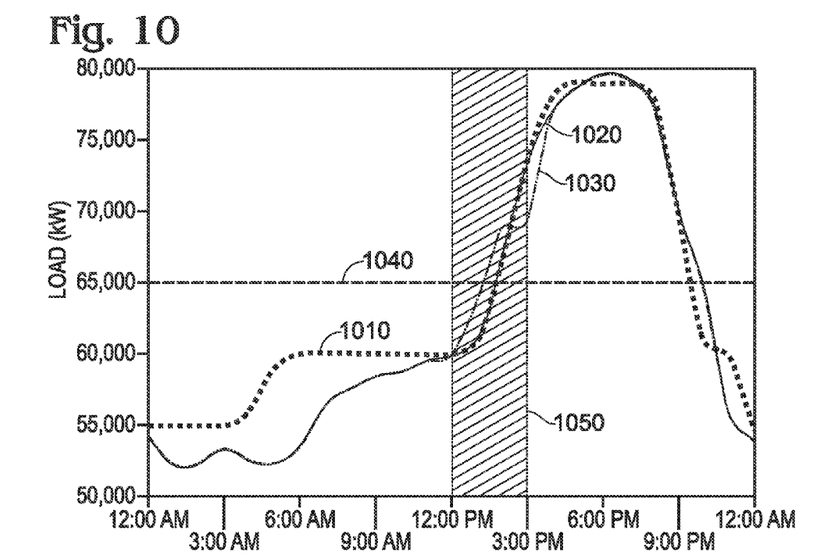
FIGS. 10 and 11 are load-time diagrams showing operation of the method of FIG. 6 where a malfunction in actual load determination is detected and true actual load at times exceeds predicted load during the malfunction period.
Figure 11:
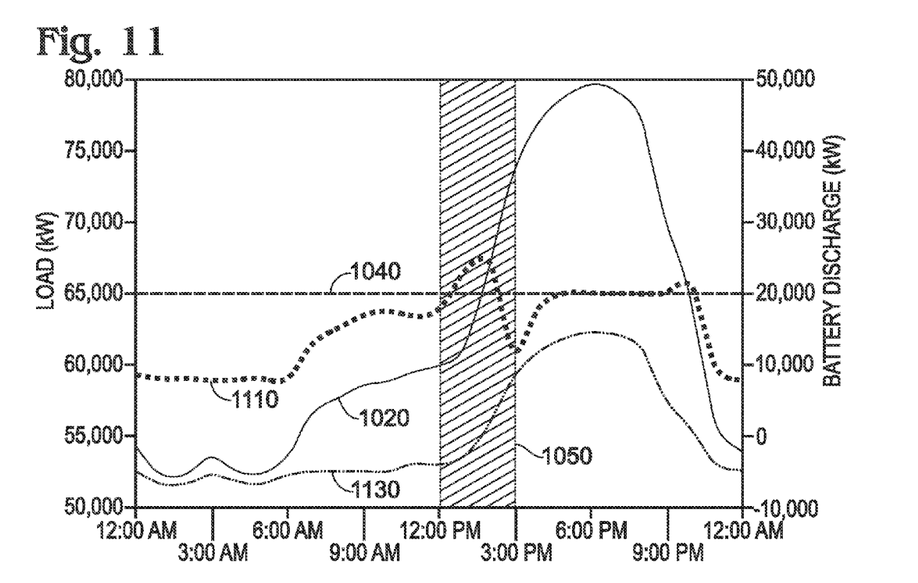

FIGS. 10 and 11 are load-time diagrams showing operation of the method of FIG. 6 where a malfunction in actual load determination is detected and actual load 1030 at times exceeds the predicted load 1010 during the malfunction period 1050. The case where the actual load at times exceeds the predicted load during the malfunction period is relatively uncommon since the predicted load is computed from predicted load data for the worst case day of the billing period. Since predicted load 1010 does not grossly overestimate actual load 1030 in this case, about as much battery power as is needed to keep actual load 1030 from exceeding $P_t$ 1040 is used. Moreover, the risk that grid load 1110 will grossly exceed $P_t$ 1040 due to an erroneous determination of actual load is eliminated. In FIG. 10, management controller 530 computes predicted load 1010 using predicted load data ($P_t$, $t_{ps}$, $t_{pe}$, $t_{max}$, $P_p$, F) stored in management database 510. Predicted load in the example illustrated includes three discrete sections including a peak, during peak load times, that rises above $P_t$; a first non-peak section, during non-peak load times where significant actual load is presumed, set just below $P_t$; and a second non-peak section, during non-peak load times where minimal actual load is presumed, set well below $P_t$. Initially, management controller 530 uses actual load 1030 as the effective load 1020. At the beginning of malfunction period 1050, management controller 530 transitions to using predicted load 1010 as effective load 1020 to eliminate the risk of using a grossly underestimated actual load that could cause a misallocation of battery power and substantial increase in peak load. Then, at the end of malfunction period 1050, management controller 530 reverts to using actual load 1030 as effective load 1020. Turning next to FIG. 11, it is seen that using predicted load 1010 as effective load 1020 during malfunction period 1050 slightly underestimates actual load at the beginning of malfunction period 1050, causing lesser discharge of stored power 1130 from battery system 440 than would occur if there had been no malfunction and resulting in grid load 1110 slightly exceeding $P_t$ 1040. However, the nominal increase in peak load from using predicted load 1010 as effective load 1020 is far preferable to the risk of using a grossly inaccurate actual load that could cause a misallocation of battery power and substantial spike in peak load.

In rare cases, actual load during a malfunction period may substantially exceed the predicted load. In these cases, the peak load drawn on the electric utility may exceed $P_t$ by a considerable amount despite using the predicted load as the effective load. However, using the predicted load as the effective load will still result in a lower peak load that would occur if a grossly inaccurate actual load were used as the effective load.

In addition to substituting a predicted load for actual load in response to a malfunction in determining actual load, management controller 530 may take load shedding countermeasures. Load shedding countermeasures automatically reduce controllable load, such as air conditioning load, in response to a malfunction in determining actual load, creating an additional safety margin against actual load exceeding the target peak load during the malfunction period. Load shedding countermeasures may be implemented as a configurable option of management system 500. Management processor 530 can determine the amount of load that is shed using factors such as a weather forecast. For example, if overcast weather is forecast, poor generation of solar power may be presumed and the amount of load that is shed may be increased. On the other hand, if mild temperatures are forecast, use of HVAC resources may be presumed to be low and the amount of load that is shed may be reduced.

It will be appreciated by those of ordinary skill in the art that the invention can be embodied in other specific forms without departing from the spirit or essential character hereof. The present description is thus considered in all respects to be illustrative and not restrictive. The scope of the invention is indicated by the appended claims, and all changes that come with in the meaning and range of equivalents thereof are intended to be embraced therein.

What is claimed is:

1. A peak load management system, comprising:
a battery system configured to store power and discharge stored power;
a measurement system configured to measure actual load; and
a peak load management controller operatively coupled with the battery system and the measurement system and configured to receive actual load data from the measurement system, detect malfunctions in determining actual load, compare an effective load and a target peak load and regulate a discharge of stored power from the battery system based at least in part on outcomes of comparisons of the effective load and the target peak load, wherein the management controller is further configured to use actual load as the effective load in first comparisons of the effective load and the target peak load and, in response to detecting a malfunction in determining actual load, substitute a predicted load for actual load as the effective load in second comparisons of the effective load and the target peak load, wherein the management controller is further configured to detect recoveries from malfunctions in determining actual load and, in response to detecting a recovery from the malfunction, substitute actual load for the predicted load as the effective load in third comparisons of the effective load and the target peak load.

2. The management system of claim 1, wherein the management controller is further configured to compute the predicted load based at least in part on past actual load.

3. The management system of claim 1, wherein the discharge of stored power from the battery system is regulated at least in part by discharging stored power from the battery system when actual load exceeds the target peak load.

4. The management system of claim 1, wherein the discharge of stored power from the battery system is regulated at least in part by discharging stored power from the battery when the predicted load exceeds the target peak load.

5. The management system of claim 1, wherein the malfunction comprises a malfunction of the measurement system.

6. The management system of claim 1, wherein the malfunction comprises a malfunction of a communication channel between the measurement system and the management controller.

7. The management system of claim 1, wherein the malfunction comprises a malfunction of the management controller.

8. The management system of claim 1, wherein the management controller is further configured to shed actual load in response to the malfunction.

9. The management system of claim 8, wherein the management controller is configured to use weather data to determine an amount of actual load that is shed.

10. The management system of claim 1, wherein actual load is a net load representing power consumed at a site reduced by power generated at the site.

11. A peak load management method, comprising the steps of:
measuring, by a peak load management system, actual load;
detecting, by the management system, a malfunction in determining actual load;
detecting, by the management system, a recovery from the malfunction in determining actual load;
comparing, by the management system, an effective load and a target peak load; and
regulating, by the management system, a discharge of stored battery power based at least in part on outcomes of comparisons of the effective load and the target peak load,
wherein the management system uses actual load as the effective load in first comparisons of the effective load and the target peak load and, in response to detecting the malfunction in determining actual load, substitutes a predicted load for actual load as the effective load in second comparisons of the effective load and the target peak load and, in response to detecting the recovery from the malfunction in determining actual load, substitutes actual load for the predicted load as the effective load in third comparisons of the effective load and the target peak load.

12. The management method of claim 11, further comprising the step of:
detecting, by the management system, recoveries from malfunctions in determining actual load,
wherein the management system detects a recovery from the malfunction and, in response to detecting the recovery, substitutes actual load for the predicted load as the effective load in third comparisons of the effective load and the target peak load.

13. The management method of claim 11, further comprising the step of computing, by the management system, the predicted load based at least in part on past actual load.

14. The management method of claim 11, wherein the predicted load is an expected load on a worst case day of a billing period.

15. The management method of claim 11, wherein the discharge of stored power from the battery system is regulated at least in part by discharging stored power from the battery system when actual load exceeds the target peak load.

16. The management method of claim 11, wherein the discharge of stored power from the battery system is regulated at least in part by discharging stored power from the battery when the predicted load exceeds the target peak load.

17. The management method of claim 11, wherein the malfunction comprises a malfunction of a measurement system.

18. The management method of claim 11, wherein the malfunction comprises a malfunction of a communication channel between a measurement system and a management controller.

19. The management method of claim 11, wherein the malfunction comprises a malfunction of a management controller.

20. The management method of claim 11, further comprising the step of shedding, by the management system, actual load in response to the malfunction.

21. The management method of claim 20, wherein an amount of actual load that is shed is determined by the management system using weather data.

22. The management method of claim 11, wherein actual load is a net load representing power consumed at a site reduced by power generated at the site.

* * * * *

UNITED STATES PATENT AND TRADEMARK OFFICE
CERTIFICATE OF CORRECTION

PATENT NO.      : 8,761,949 B2
APPLICATION NO. : 13/484633
DATED           : June 24, 2014
INVENTOR(S)     : Carl Mansfield It is certified that error appears in the above-identified patent and that said Letters Patent is hereby corrected as shown below:

In the Claims:

Column 10, line 12, insert the following claim before "4.":
   --4. The management system of claim 1, wherein the predicted load is an expected load on a worst case day of a billing period.--.

Column 10, line 12, replace "4." with --5.--.

Column 10, line 16, replace "5." with --6.--.

Column 10, line 19, replace "6." with --7.--.

Column 10, line 23, replace "7." with --8.--.

Column 10, line 26, replace "8." with --9.--.

Column 10, line 29, replace "9." with --10.--.

Column 10, line 29, replace "8" with --9--.

Column 10, line 32, replace "10." with --11.--.

Column 10, line 35, replace "11." with --12.--.

Column 10, line 60, cancel the text beginning with "12. The management method of claim 11" to and ending in "the target peak load." at column 11, line 3.

Column 11, line 4, replace "11" with --12--.

Signed and Sealed this
Ninth Day of September, 2014

Michelle K. Lee
*Deputy Director of the United States Patent and Trademark Office*

CERTIFICATE OF CORRECTION (continued)
U.S. Pat. No. 8,761,949 B2

Column 11, line 7, replace "11" with --12--.

Column 11, line 10, replace "11" with --12--.

Column 11, line 14, replace "11" with --12--.

Column 11, line 18, replace "11" with --12--.

Column 12, line 1, replace "11" with --12--.

Column 12, line 5, replace "11" with --12--.

Column 12, line 8, replace "11" with --12--.

Column 12, line 14, replace "11" with --12--.